Oct. 17, 1950   R. KURZWEIL ET AL   2,526,487
LATHE
Filed July 25, 1947   5 Sheets-Sheet 1

FIG. I.

INVENTORS: ROBERT KURZWEIL
JUVENTINO JOSE PESQUEIRA
BY:
J. B. Feeslin
ATTORNEY

Oct. 17, 1950 R. KURZWEIL ET AL 2,526,487
LATHE
Filed July 25, 1947 5 Sheets-Sheet 5

INVENTORS: ROBERT KURZWEIL
JUVENTINO JOSE PESQUEIRA
BY:
ATTORNEY

Patented Oct. 17, 1950

2,526,487

UNITED STATES PATENT OFFICE 2,526,487

LATHE

Robert Kurzweil and Juventino Jose Pesqueira, New York, N. Y., assignors to Morey Machinery Co., Inc., Astoria, N. Y., a corporation of New York Application July 25, 1947, Serial No. 763,646

3 Claims. (Cl. 82—25)

This invention relates to lathes. It is particularly directed to means for turning a work piece on a lathe and a steady rest to prevent chatter and deflection or taper turning which may result from deflection when turning the work piece.

Another object of this invention is to provide in a lathe for turning railroad car axles, a highly improved steady rest to prevent chatter and deflection of the axle when turning the journal and wheel seat diameters of said axle.

Another object of this invention is to provide in a lathe of the character described, a base adapted to be attached to the bed of the lathe, a carriage mounted on the base for reciprocation longitudinally of the lathe spindle axis, a steady rest or roller slide mounted for sliding movement on the carriage transversely of the lathe spindle, a tool slide slidably mounted on the carriage likewise for movement transversely of the spindle axis, and hydraulic means for automatically and sequentially feeding the carriage forward from initial position with the tool slide in cutting position and with the roller slide moved out of contact with respect to the axle, and when the carriage has moved to the end of the cutting stroke, to move the tool slide out of contact with respect to the axle, and the roller slide in for engagement of the steady rest rollers with the axle, and moving the roller slide out away from the axle as the carriage begins its return movement to its initial position, while the tool slide is also in its out position away from the axle.

Still another object of this invention is to provide in a lathe of the character described, a steady rest slide movable transversely of the spindle axis and carrying a pair of steady rest rollers, one roller being rotatable upon a concentric axis and the other roller being rotatable upon an eccentric axis, so that the slide may be moved toward the axle until the roller with the concentric axis contacts the axle and the other roller may then be moved about its eccentric axis into contact with the axle. Such a construction obviates the difficulty in using two steady rest rollers on concentric axes since when such a roller slide is moved toward the axle, one roller may contact the axle before the other roller.

Yet another object of this invention is to provide in a lathe of the character described, a base attached to the bed of the lathe, a carriage slidably movable on the base longitudinally of the bed, hydraulic means for reciprocating the carriage on the base, a pair of slides mounted on the carriage for movement transversely of the movement of the carriage, one slide carrying a steady rest, and the other slide carrying a cutting tool, and manual means to adjust the position of the carriage relative to the base.

Yet another object of this invention is to provide in a lathe of the character described a base attached to the bed of the lathe, a carriage slidably mounted on the base for movement longitudinally of the bed of the lathe, a hydraulic cylinder fixed to the carriage and disposed parallel to the bed of the lathe, a piston within the cylinder and piston rod extending from the piston and adjustably connected to the base, and a tool slide on the carriage movable transversely of the bed of the lathe, whereby the tool on the slide may be adjusted to desired position relative to a work piece on a lathe.

Yet a further object of this invention is to provide strong, rugged and durable lathe construction of the character described, which shall be relatively inexpensive to manufacture, which shall be smooth and positive in operation and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possile illustrative embodiments of this invention, Fig. 1 is a top plan view of a lathe embodying the invention with a work piece mounted thereon;

Figure 1:
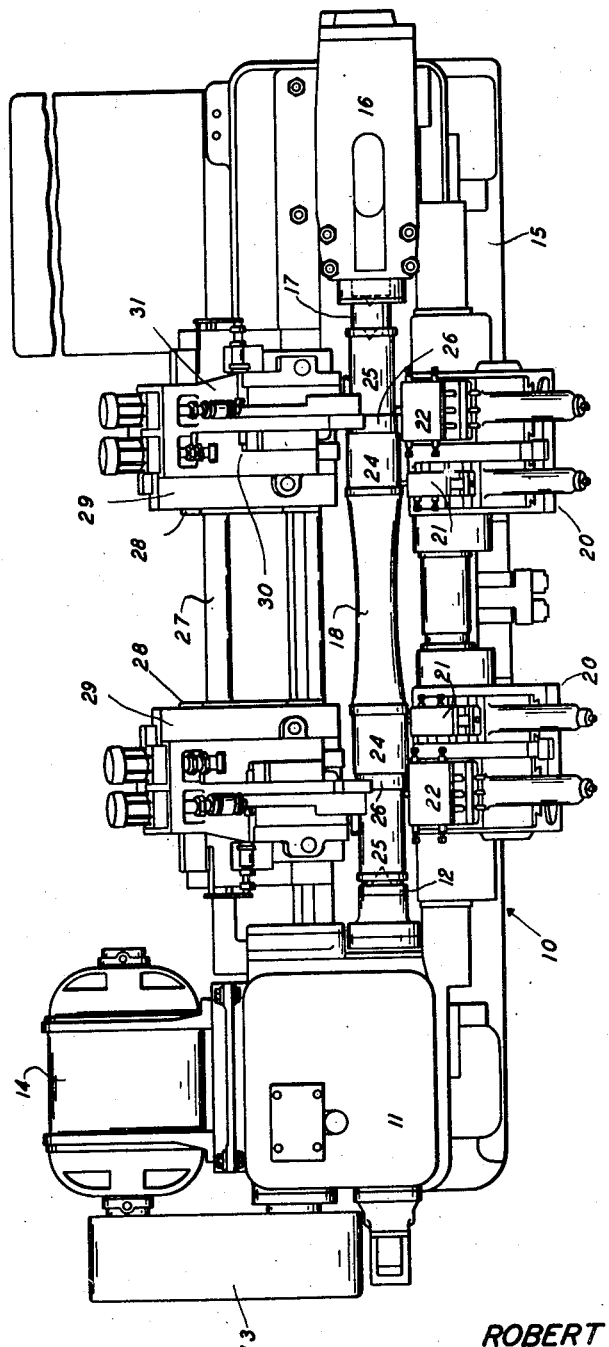

Referring now in detail to the drawing, 10 designates a lathe embodying the invention. The lathe comprises generally of a headstock 11 and a spindle 12 thereon. The spindle 12 is driven through suitable driving connections within the headstock and belt 13 connected to a motor 14. The lathe however includes a frame 15 on which is mounted a tailstock 16 provided with a quill 17. The work piece 18 shown herein for the purpose of illustration is a railroad car axle and is chucked between the headstock spindle 12 and the tailstock quill 17.

The lathe 10 is shown in greater detail in copending application Serial No. 627,985, filed November 13, 1945, and now Patent No. 2,494,196, granted January 10, 1950, by applicant Juventino Jose Pesqueira, and application Serial No. 627,984, filed November 13, 1945, by applicants herein.

The lathe furthermore includes front left and right carriages 20, each carrying tool slides 21 and 22. The tool on the tool slides 21 turn the wheel seats 24 of the axle 18. The tools on the slides 22 turn the journals 25.

Means is provided for turning the dust collars 26 of the axle 18 and to provide a steady rest to prevent deflection and taper turning which results from deflection when turning the journal and wheel seat diameters. To this end, the lathe is provided with a longitudinal bed 27 on which are mounted right and left bases 28, each carrying a carriage 29. Since the left and right bases and carriages are similar, the base and carriage on one side only will be described. On each base 29 is mounted a tool slide 30, and a steady rest or roller slide 31, as will appear hereinafter.

Figure 2:
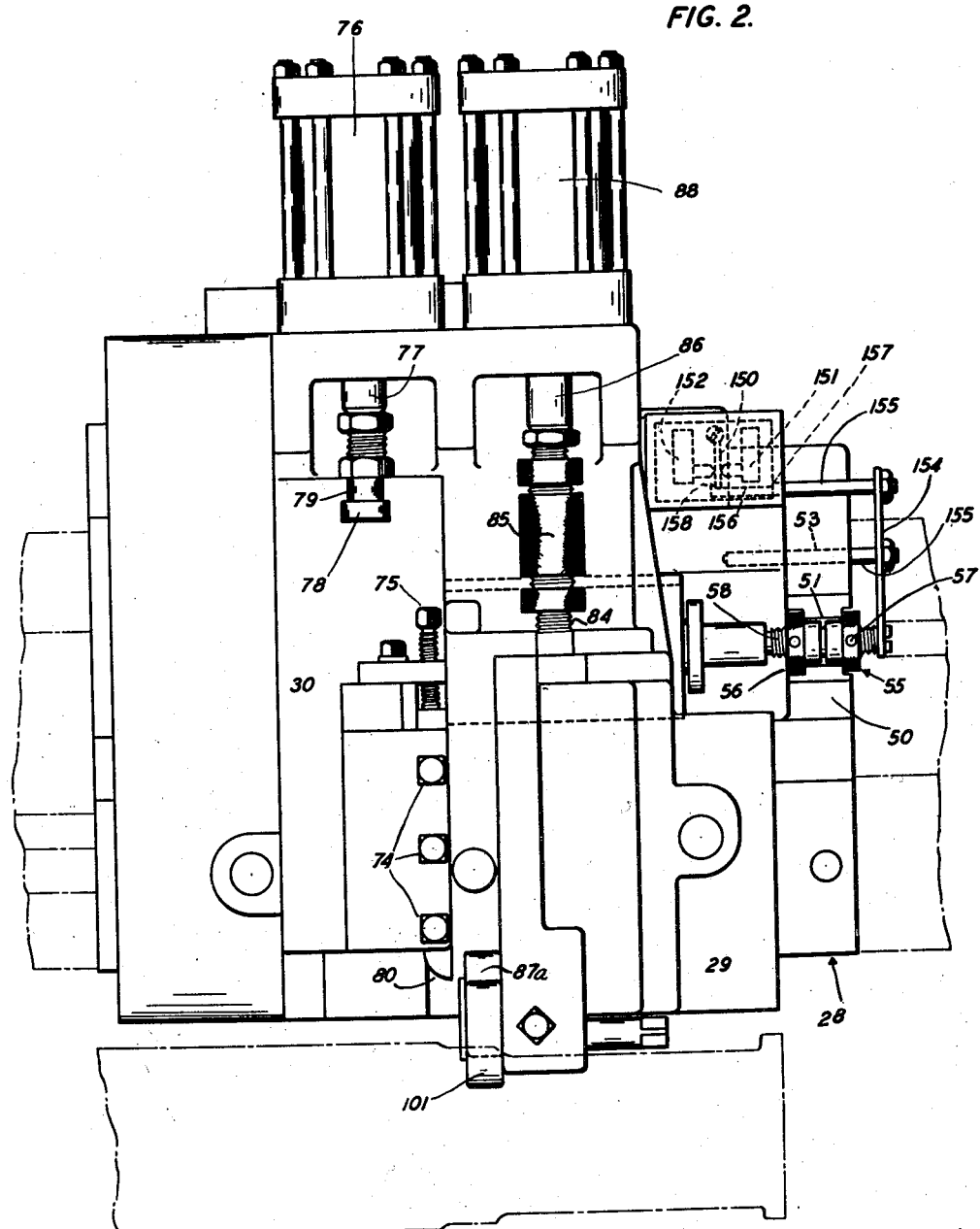
Fig. 2 is a top plan view of one of the rear carriages and its base, showing the work piece in dot-dash lines.
Figure 3:
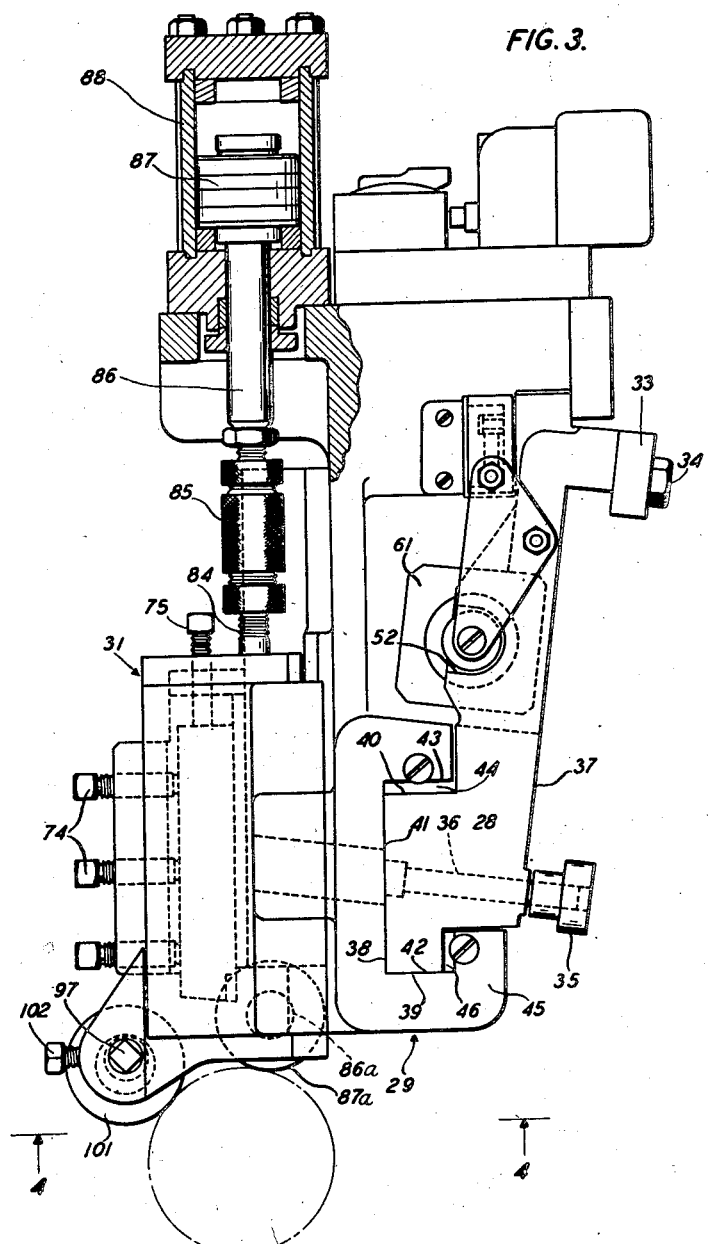
Fig. 3 is a side view of the structure shown in Fig. 2.
Figure 4:
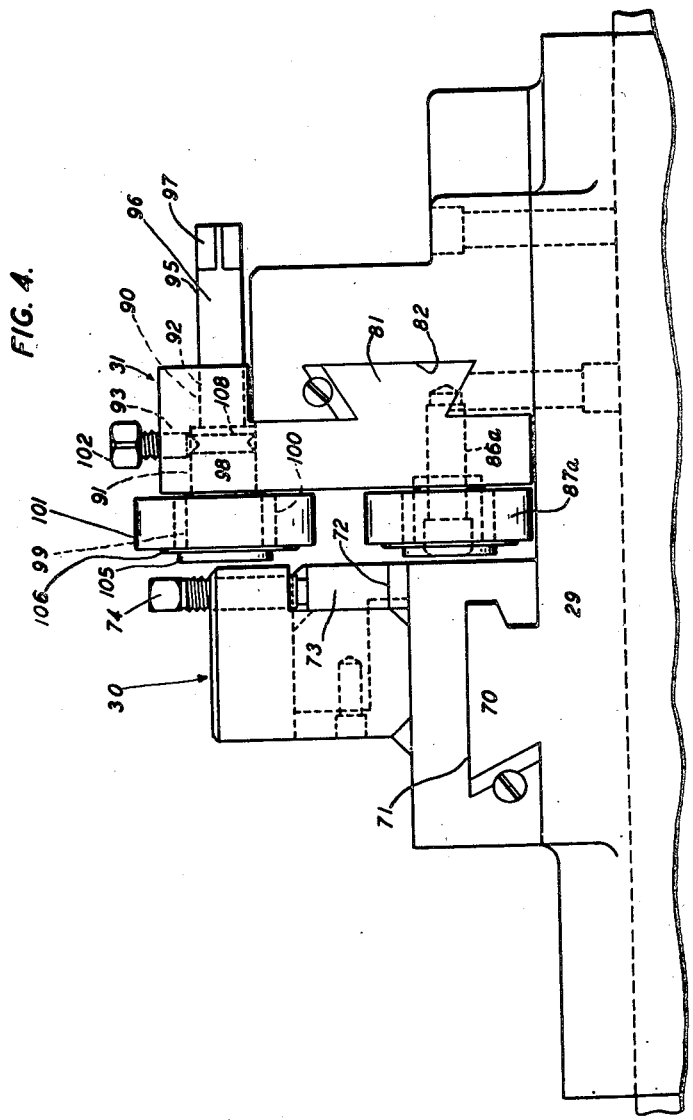
Fig. 4 is a partial view taken on the plane 4—4 of Fig. 3.
Figure 5:
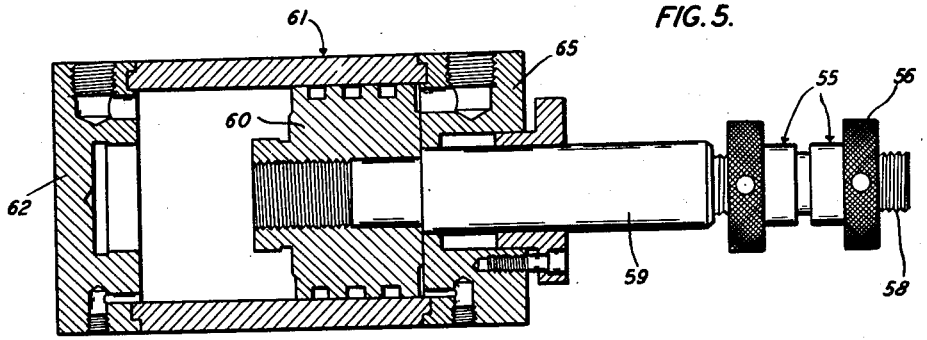
Fig. 5 is a cross-sectional view illustrating the hydraulic cylinder attached to the carriage.
Figure 6:
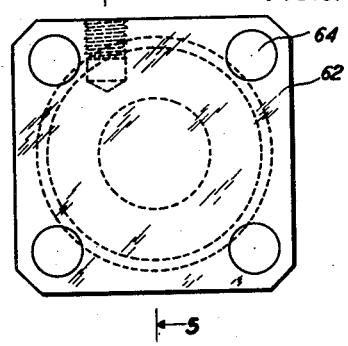
Fig. 6 is an end view of the cylinder shown in Fig. 5.

In Figs. 2, 3 and 4, is illustrated the right rear slide or carriage and its base, and the same will be described hereinafter. In said figures, 28 indicates a base fixed to the bed 27 by any suitable clamping means, such as bar 33 attached to the base 28 by bolt 34 and engaging an underside of the bed. The base is also clamped in place by a clamping nut 35 screwed to a stud 36 on the base. The base 28 may have a forwardly and downwardly inclined under surface 37 resting on the bed. The base 28 has a top horizontal surface 38, a forward vertical edge 39, and a rear vertical surface 40. The carriage 29 has an under-surface 41 contacting the surface 38 of the base, a surface 42 contacting surface 39, and a surface 43 parallel to surface 40. Between surfaces 40 and 43 is a gib 44. The carriage is formed with a rearwardly extending bottom flange 45 and interposed between said flange and the underside of the base is a gib 46. The base is formed at one end with an upstanding wall 50, formed at its upper surface with a U-shaped rib 51 having a U-shaped notch 52. Said base is furthermore formed with a horizontal longitudinal opening 53, for the purpose hereinafter appearing.

Rotatably mounted in the notch 52 are a pair of rotary nuts 55 having knurled outer peripheral flanges 56 formed with radial socket openings 57 for insertion of a pin or tool to rotate said nuts.

The peripheral flanges 56 contact opposite ...des of rib 51 so that said nuts are rotatably but ion-slidably mounted on the flange. Extending through the central threaded openings of the nuts is a threaded shaft 58. The threaded shank 58 comprises one end of a piston rod 59 to which a piston 60 is attached. Said piston 60 is slidably mounted in a hydraulic cylinder 61 fixed with respect to the carriage 29 in any suitable manner. The cylinder 61 has an end wall 62 at one end attached thereto by means of bolts 64. At the other end of the cylinder 61 is a stuffing box 65 through which the piston rod 59 passes. The end wall 62 and the stuffing box 65 are formed with suitable passages for hydraulic medium.

It will now be understood that when hydraulic medium under pressure enters passage in wall 62, the carriage is moved to the left looking at Fig. 2, and when hydraulic medium under pressure enters the passage in gland 65, the carriage is moved to the right looking at Fig. 2.

The position of the carriage at its end stroke may be adjusted relative to the base by adjusting the nuts 55. Adjustment of said nut changes the position of the piston 60 relative to the base, and since the carriage is moved until the piston reaches the end of its stroke in opposite directions, the location of the stroke of the carriage is thereby changed for the purpose hereinafter appearing.

The carriage 29 is shown in Fig. 4 of the drawing as formed with an upstanding dove-tailed flange 70 extending transversely of the bed of the lathe, and the tool slide 30 is formed with a dove-tailed groove 71 receiving said projection for mounting the tool slide for sliding movement transversely of the work piece. The tool slide 30 is formed with a groove 72 in the side face thereof in which is mounted a turning tool 73 held in said groove by a plurality of set screws 74. The tool may be held in a groove against longitudinal movement by a stop set screw 75. Mounted on the rear of the carriage is a hydraulic cylinder 76. Within the cylinder is the usual piston carried on the piston rod 77. At the forward end of the piston rod 77 is a head 78 received in a T-shaped notch 79 at the rear of the tool slide. Thus, movement of the piston in cylinder 76 will cause corresponding movement of the tool slide 30. The cutting edge 80 of the tool 73 may be advanced to engage the dust collar surface 26 for turning the same when the carriage is moved longitudinally inwardly towards the center of the work piece.

The roller slide 31 has a dove-tailed projection 81 received in a dove-tailed groove 82 in the carriage. At the rear end of the roller slide is a stud 84 connected by a turnbuckle 85 to one end of a piston rod 86. Piston rod 86 carries a piston 87 within a cylinder 88 attached to the carriage. Thus movement of the piston 87 within the cylinder 88 will cause corresponding movement of the roller slide 31.

On the roller slide is a horizontal longitudinal stud shaft 86a, on which is mounted a steady rest roller wheel 87a adapted to contact the dust collar surface of the work piece when the roller slide is moved toward the work piece. The roller slide 31 is furthermore formed with a counterbored through opening 90. Through opening 90 passes a portion 91 of greater diameter and a portion 92 of smaller diameter. The roller slide is furthermore formed with a threaded through opening 93 communicating with opening 91. Rotatably mounted in the through opening 90 is a shaft 95. Said shaft 95 comprises a portion 96 disposed within opening 92 and projecting therefrom, and formed at its end with a wrench engaging head 97. Extending from portion 96 of the shaft 95 is a portion 98 disposed within opening 91.

It will be noted that portions 91 and 92 of opening 90 are co-axial and likewise portions 96 and 98 of shaft 95 are co-axial. Extending from portion 98 is a portion 99 which is eccentric with respect to shaft portions 96 and 98. On portion 99 is a bearing bushing 100 and mounted on the bushing 100 is a roller 101. Within opening 93 is a set screw 102.

It will now be understood that when the set screw 102 is loosened, shaft 95 may be rotated to vary the position of the roller 101 toward or away from the work piece. On shaft portion 99 is a head 105. Between the head 105 and the wheel 101 is a washer 106. Shaft portion 98 is formed with an annular groove 108 to receive the tip of the set screw 102. The set screw thus prevents axial movement of shaft 96.

In order to insure contact with both rollers, wheels 87a and 101 with the dust collar surface of the axle, the shaft 97 is first rotated to bring wheel 101 rearwardly or away from the work piece. The roller slide is then moved forwardly and turnbuckle 85 turned properly until wheel 87a contacts the dust collar surface of the work piece or axle. Shaft 107 is then rotated until wheel 101 contacts said dust collar surface. Set screw 102 is then tightened to retain wheel 101 in its adjusted position.

Figure 7:
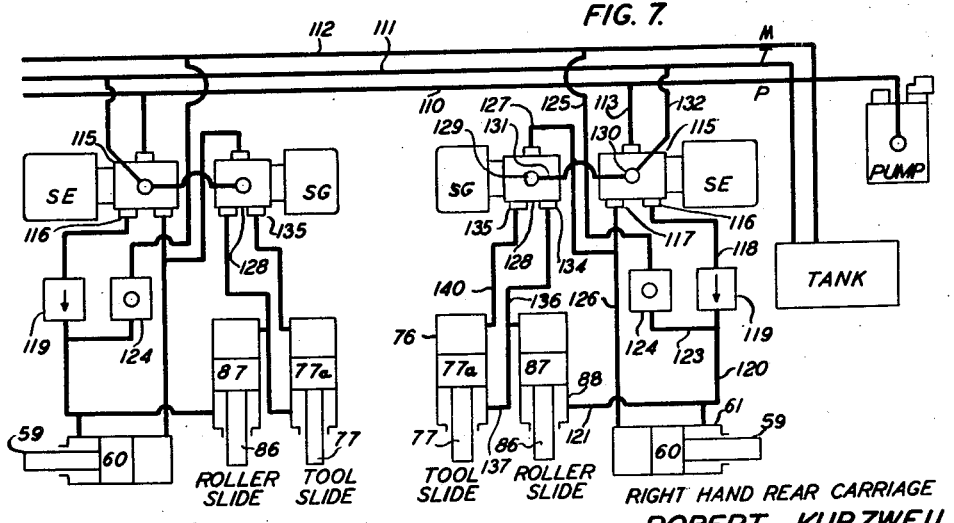
Fig. 7 is a diagrammatic view illustrating the hydraulic system for controlling the carriages, roller slides and tool slides.

The hydraulic system for controlling the roller slide, the tool slide and the carriage is illustrated in Fig. 7 of the drawing. As shown in Fig. 7, hydraulic medium under pressure is supplied by conduit 110 which leads to a pump. Hydraulic medium is returned to tank by conduit 111. Hydraulic medium is also returned to tank through metering conduit 112. The pump conduit 110 is connected by pipe 113 to the inlet end of a four way valve 115 controlled by a solenoid marked SE in the drawing. The valve 115 has two outlets 116 and 117. Outlet 116 is connected by conduit 118 to a check valve 119 which is connected by conduit 120 to one end of the carriage cylinder 61. It is also connected by conduit 121 to the front end of the roller slide cylinder 88. Conduit 120 is also connected by conduit 123 to an adjustable metering valve 124, which in turn is connected by conduit 125 to the metering conduit 112. The outlet 117 of the four way valve 115 is connected by conduit 126 to the other end of the cylinder 61. Conduit 126 is connected by conduit 127 to the inlet end of another 4 way valve 128, controlled by solenoid marked SG on the drawing. The return outlets 129 and 130 of valves 128 and 115, respectively, are interconnected by conduit 131. The return outlet 130 is connected by conduit 132 to the tank conduit 111. The four way valve 128 has a pair of pressure outlets 134 and 135. Outlet 134 is connected by conduit 136 to the rear end of roller slide cylinder 88 and by conduit 137 to the front end of the tool slide cylinder 76. The rear end of the tool slide cylinder 76 is connected by conduit 140 to the pressure outlet 135 of the four way valve 128.

The four way valves 115 and 128 are of well known construction. The valve is so constructed that the solenoid in one position connects pressure inlet 113 with one of the pressure outlets, and in such position the other pressure outlet is connected to the return outlet 130. In another position of the solenoid SE, the other pressure outlet is connected to the pressure inlet 113, and the first pressure outlet is connected to the relief outlet 130. The operation is the same for four way valve 128, the pressure being alternated between outlets 134 and 135 and that when one of said outlets is connected to pressure, the other is connected to tank.

An electrical system is provided controlled by a switch 150 mounted on the carriage. Movement of the limit switch 150 in one direction will actuate a micro switch 151, and movement of the limit switch in an opposite direction will operate a micro switch 152. Means is provided to coordinate the limit switch 150 with the movement of the carriage. To this end, there is fixed to the outer end of shaft 58 a plate 154. Fixed to the plate 154 is a pin 155 which slides in opening 53 in the base. Attached to bracket 154 is a rod 155 slidably mounted in a suitable opening in the carriage. Rod 155 is formed with a longitudinal groove 156 forming a pair of end shoulders 157 and 158 at the ends of the groove. As the carriage moves, the limit switch 150 will alternatingly contact the end shoulders 157 and 158 to operate the micro switches 151 and 152 in the electric system which controls the solenoids SE and SG, through suitable relays.

The sequence of operation of the hydraulic system will now be described. Starting with the condition where solenoid SE is energized, SG is also energized. The carriage feeds inwardly towards the center of the work piece, as hydraulic medium under pressure passes from the four way valve 115 to conduit 126 and cylinder 61 to move the carriage of the right hand rear slide to the left, looking at Fig. 7. At the same time, pressure passes through conduit 127 to valve 128 and through conduit 140 to the tool slide cylinder 76 keeping the tool slide piston 77a advanced inwardly with the tool in cutting position. Hydraulic medium passes out of the carriage cylinder 61 but cannot pass through the check valve 119 against the direction of the arrow. Hydraulic medium therefore passes through conduit 123, and the metering valve 124 to the metering conduit 112 back to tank. Pressure is allowed to build up however by the restriction of valve 124, in conduit 121 sufficient to retract piston 87 in the roller slide cylinder 88. At the same time, hydraulic medium passes from cylinders 76 and 88 through pipes 137 and 136 to passage 134, valve 128, conduits 131 and 132, back to tank. Thus, as the carriage feeds toward the center, the tool slide is in, and turns the workpiece, while the roller slide is out.

At the end of the cutting stroke, operation of the limit switch causes deenergization of solenoid SG while solenoid SE remains energized. Thus, the carriage stays forward or at its most inward position. Pressure now comes from pump, valve 115, conduit 126, conduit 127, conduit 136 to the rear of the roller slide 88 to move the roller slide inwardly, and through conduit 137 to the front of cylinder 76 to retract the tool slide.

Hydraulic medium goes back to tank from cylinder 76 through conduit 140, and hydraulic medium passes from cylinder 88, through the metering valve 124 to the metering conduit 112 and tank. While the roller slide is in, and the rollers 87a and 101 are in contact with the work piece, the tools on the front carriages may cut the wheel seat and journal diameters, and during such operation the roller slide serves as a steady rest to prevent deflection of the axle, and hence to prevent taper turning and chatter.

Upon deenergization of solenoid SE, the right hand carriage moves to the right, and both the tool slide and the roller slide move out. Upon deenergization of solenoid SE, oil under pressure flows through conduit 118, check valve 119 to carriage cylinder 61 moving the carriage cylinder to the right. Hydraulic medium also moves through conduit 121 to the front end of cylinder 88 to retract the piston 87 and also the roller slide. The tool slide has been retracted and remains in such position as described heretofore. When the carriage completes its movement to the right, the limit switch is again actuated to energize both solenoids SE and SG, thereby again causing the carriage to move toward the middle, the tool slide to move in while the roller slide remains out.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. In a lathe, a bed, a base fixed to the bed, a carriage slidably mounted on the base for movement longitudinally of the bed, a first cylinder fixed to said carriage, a piston within said first cylinder, adjustable means to connect said first piston to said base, a tool slide slidably mounted on said carriage for movement transversely of the bed, a second cylinder attached to said carriage, a second piston within said second cylinder, means to connect said second piston to the tool slide, a roller slide slidably mounted on the carriage for movement transversely of the bed, a third cylinder mounted on said carriage, a third piston in said third cylinder on said carriage, and means to connect said third piston in said third cylinder on the carriage to said roller slide.

2. In a lathe, a bed, a base fixed to the bed, a carriage slidably mounted on the base for movement longitudinally of the bed, a first cylinder fixed to the carriage, a first piston within said first cylinder, adjustable means to connect said first piston to the base, a tool slide slidably mounted on the carriage for movement transversely of the bed, a second cylinder attached to the carriage, a second piston within said second cylinder, means to connect said second piston to the tool slide, a roller slide slidably mounted on the carriage for movement transversely of the bed, a third cylinder mounted on the carriage, a third piston in said third cylinder on the carriage, means to connect said third piston in said third cylinder on the carriage to the roller slide, a pair of rollers rotatably mounted on the roller slide for rotation about parallel axes, and means to adjust the axis of one of said rollers relative to said roller slide.

3. In a lathe, a bed, a base fixed to the bed, a carriage slidably mounted on the base for movement longitudinally of the bed, a first cylinder fixed to the carriage, a first piston within said first cylinder, adjustable means to connect said first piston to the base, a tool slide slidably mounted on the carriage for movement transversely of the bed, a second cylinder attached to the carriage, a second piston within said second cylinder, means to connect said second piston to the tool slide, a roller slide slidably mounted on the carriage for movement transversely of the bed, a third cylinder mounted on the carriage, a third piston in said third cylinder on the carriage, means to connect said third piston in said third cylinder on the carriage to the roller slide, a pair of rollers rotatably mounted on the roller slide for rotation about parallel axes, means to adjust the axis of one of said rollers relative to the roller slide, and means to adjust the roller slide relative to the piston connected thereto.

ROBERT KURZWEIL.
JUVENTINO JOSE PESQUEIRA.

REFERENCES CITED

The following references are of record in the file of this patent:

UNITED STATES PATENTS

| Number | Name | Date |
|---|---|---|
| 804,131 | Johnson | Nov. 7, 1905 |
| 1,212,257 | Pokora | Jan. 16, 1917 |
| 1,334,335 | Warren | Mar. 23, 1920 |
| 1,559,296 | Sundstrand | Oct. 27, 1925 |
| 1,976,072 | Howard | Oct. 9, 1934 |
| 2,325,849 | Groene | Aug. 3, 1943 |
| 2,338,125 | May | Jan. 4, 1944 |
| 2,392,074 | Wasson | Jan. 1, 1946 |

FOREIGN PATENTS

| Number | Country | Date |
|---|---|---|
| 1,340 | Great Britain | 1914 |